(12) United States Patent
Gonze et al.

(10) Patent No.: US 8,141,350 B2
(45) Date of Patent: Mar. 27, 2012

(54) ELECTRICALLY HEATED PARTICULATE FILTER INCOMPLETE REGENERATION IDENTIFICATION SYSTEM AND METHOD

(75) Inventors: Eugene V. Gonze, Pinckney, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 264 days.

(21) Appl. No.: 12/476,576

(22) Filed: Jun. 2, 2009

(65) Prior Publication Data
US 2010/0300075 A1 Dec. 2, 2010

(51) Int. Cl.
*F01N 3/00* (2006.01)
(52) U.S. Cl. ................. 60/286; 60/303; 60/311
(58) Field of Classification Search .......... 60/286, 60/287, 295, 303, 311
See application file for complete search history.

(56) References Cited

U.S. PATENT DOCUMENTS

| 4,404,795 | A * | 9/1983 | Oishi et al. | 60/274 |
| 2005/0198944 | A1* | 9/2005 | Saitoh et al. | 60/295 |
| 2007/0137186 | A1* | 6/2007 | Igarashi | 60/297 |
| 2007/0220870 | A1* | 9/2007 | Gonze et al. | 60/297 |
| 2008/0083212 | A1* | 4/2008 | Ament et al. | 60/295 |

* cited by examiner

*Primary Examiner* — Thomas Denion
*Assistant Examiner* — Patrick Maines

(57) ABSTRACT

A system comprises a regeneration module and a diagnostic module. The regeneration module controls an electric heater to heat exhaust gas produced by an engine. The regeneration module determines when a regeneration cycle of a particulate matter (PM) filter begins by comparing a temperature of the exhaust gas input to the PM filter and a first temperature threshold. The diagnostic module determines a regeneration status by comparing a temperature of the exhaust gas output by the PM filter and a second temperature threshold during a predetermined period after the regeneration cycle begins.

18 Claims, 5 Drawing Sheets

ELECTRICALLY HEATED PARTICULATE FILTER INCOMPLETE REGENERATION IDENTIFICATION SYSTEM AND METHOD

FIELD

The present disclosure relates to engine control systems, and more particularly to control systems and methods for identifying incomplete regeneration in electrically heated particulate filters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines such as diesel engines and compression ignition engines may produce particulate matter (PM) that is filtered from the exhaust gas and collected by a PM filter. The PM filter is disposed in an exhaust system of the engine. The PM filter reduces emissions of PM generated during combustion. Over time, the PM filter becomes full. During a process called regeneration, the PM may be burned within the PM filter.

There are various ways to perform regeneration including modifying engine management, using a fuel burner, using a catalytic oxidizer to increase the exhaust temperature with after injection of fuel, using resistive heating coils, and/or using microwave energy. The resistive heating coils are typically arranged in contact with the PM filter to allow heating by both conduction and convection.

Regeneration may be performed using an electrical heating technique. The electrical heating technique refers to the electrical heating of the exhaust gas entering the PM filter. One or more electrical coils may be disposed upstream from the PM filter and may be activated to heat the exhaust gas. The electrical heating technique provides a quick heating and light-off of the PM.

SUMMARY

A system comprises a regeneration module and a diagnostic module. The regeneration module controls an electric heater to heat exhaust gas produced by an engine. The regeneration module determines when a regeneration cycle of a particulate matter (PM) filter begins by comparing a temperature of the exhaust gas input to the PM filter and a first temperature threshold. The diagnostic module determines a regeneration status by comparing a temperature of the exhaust gas output by the PM filter and a second temperature threshold during a predetermined period after the regeneration cycle begins.

In other features, the regeneration module determines the regeneration cycle begins when the temperature of the exhaust gas input to the PM filter is greater than the first temperature threshold. In other features, the first temperature threshold is greater than the second temperature threshold.

In still other features, the system further comprises a regeneration completion module that determines the predetermined period based on at least one of an amount of PM in the PM filter, a flow rate of the exhaust gas, an oxygen concentration of the exhaust gas, and the temperature of the exhaust gas input to the PM filter.

In still other features, the regeneration completion module determines the second temperature threshold based on at least one of an amount of PM in the PM filter, a flow rate of the exhaust gas, an oxygen concentration of the exhaust gas, and the temperature of the exhaust gas input to the PM filter.

In still other features, the diagnostic module determines the regeneration status is incomplete when the temperature of the exhaust gas output by the PM filter is less than or equal to the second temperature threshold during the predetermined period. The diagnostic module determines the regeneration status is complete when the temperature of the exhaust gas output by the PM filter is greater than the second temperature threshold during the predetermined period.

In yet other features, the diagnostic module determines the regeneration status is complete when the temperature of the exhaust gas output by the PM filter is greater than the second temperature threshold at a first time during the period and less than or equal to a third temperature threshold at a second time during the period. The second time is greater than the first time. The third temperature threshold is less than second temperature threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
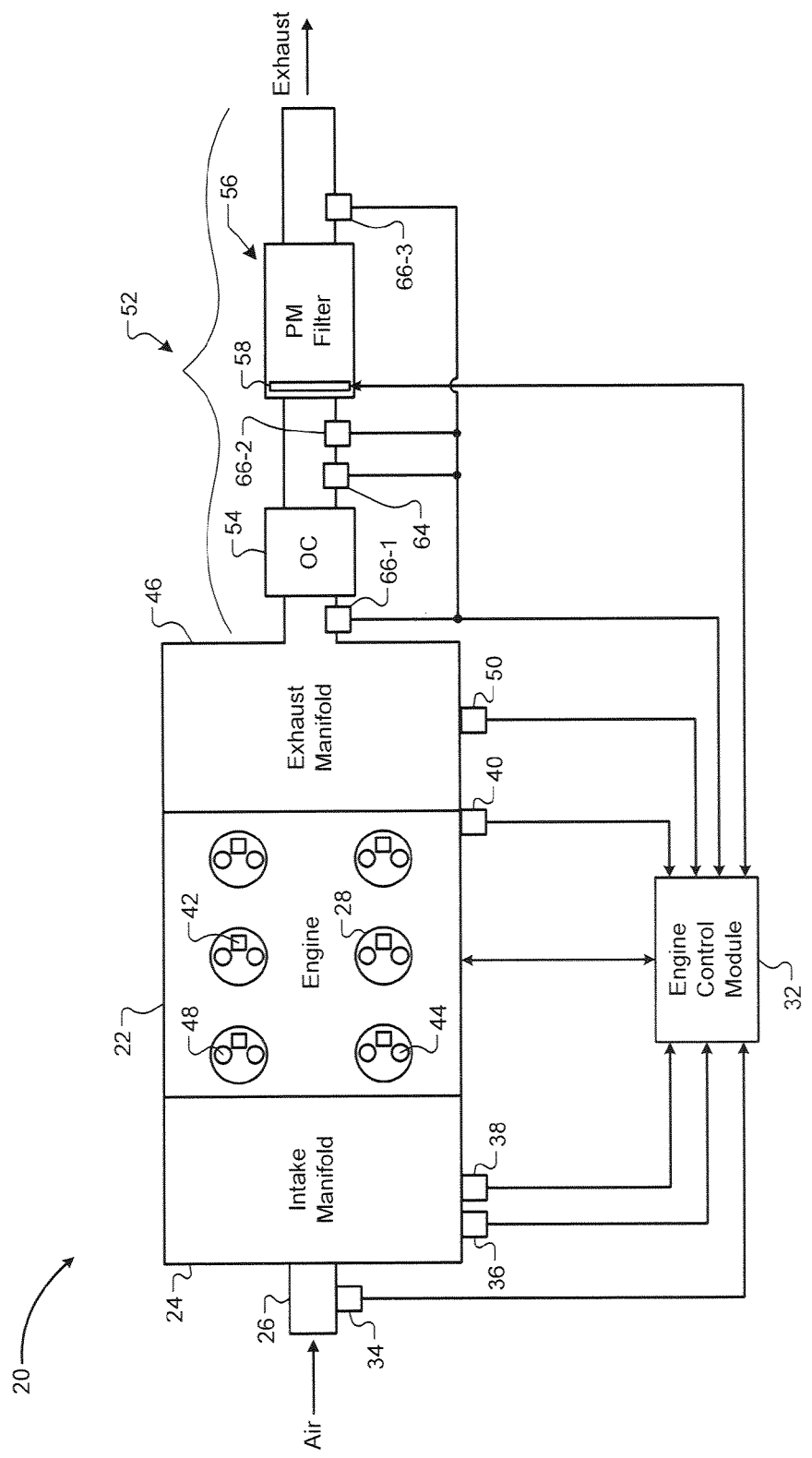
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The electrical heating technique activates heated zones of an electric heater that cause a PM combustion wave to travel down PM filter channels to regenerate downstream portions of the PM filter. This process continues until all of the heated zones are regenerated. The electric heater may be in contact with or spaced from the PM filter. The electric heater selectively heats all or portions of the PM filter. The PM filter may be in contact with or mounted close enough to the front of the PM filter to control the heating pattern.

Thermal energy is transmitted from the electric heater to the PM filter. The PM filter may be heated by convection and/or conduction. The electric heater may be divided in zones to reduce electrical power required to heat the PM filter. The zones also heat selected downstream portions within the PM filter. By heating only the selected portions of the filter, the magnitude of forces in the substrate is reduced due to thermal expansion. As a result, higher localized soot temperatures may be used during regeneration without damaging the PM filter.

The PM filter may be regenerated by selectively heating one or more of the zones in the front of the PM filter and igniting the PM using the heated exhaust gas. When a sufficient face temperature is reached, the electric heater may be turned off and the burning soot then cascades down the length of the PM filter through the channels, similar to a burning fuse on a firework. The burning soot is the fuel that continues the regeneration. This process is continued for each heated zone until the PM filter is completely regenerated.

As combustion of the PM advances through a downstream portion of the PM filter, a filter outlet gas temperature increases. Initially, the filter outlet gas temperature may increase slowly as heat from the PM combustion transfers to non-electrically heated portions of the PM filter. As the PM combustion approaches the outlet of the PM filter, the filter outlet gas temperature may increase more quickly. When regeneration completes, the filter outlet gas temperature may be greater than or equal to a regeneration completion temperature. The filter outlet temperature may then begin to decrease to a post-regeneration temperature.

A heated zone may not successfully complete regeneration of the corresponding portion. Regeneration may not complete due to a failure of the electric heater or the PM filter. A control system and method of the present disclosure diagnoses the regeneration of an electrically heated zone and detects an incomplete regeneration cycle.

The control system and method may determine a completion period. The completion period may be an estimated time for a complete regeneration of the portion. The completion period may be based on at least one of an oxygen concentration of the exhaust gas, an exhaust gas flow rate, and the filter inlet gas temperature. The control system and method may determine the regeneration completion temperature based on at least one of the oxygen concentration of the exhaust gas, the exhaust gas flow rate, and the filter inlet gas temperature.

The control system and method may determine whether regeneration completes based on the filter outlet gas temperature and the completion period. When the filter outlet gas temperature is less than the regeneration completion temperature during the completion period, an incomplete regeneration cycle may be detected. When the filter outlet gas temperature reaches the regeneration completion temperature during the completion period a complete regeneration cycle may be detected.

Referring now to FIG. 1, an exemplary engine system 20 is schematically illustrated in accordance with the present disclosure. The engine system 20 is merely exemplary in nature. The electrically heated particulate filter described herein may be implemented in various engine systems using a particulate filter. Such engine systems may include, but are not limited to, diesel engine systems, gasoline direct injection engine systems, and homogeneous charge compression ignition engine systems.

The engine system 20 includes an engine 22 that combusts an air/fuel mixture to produce drive torque. Air is drawn into an intake manifold 24 through an inlet 26. A throttle (not shown) may be included to regulate air flow into the intake manifold 24. Air within the intake manifold 24 is distributed into cylinders 28. Although FIG. 1 depicts six cylinders 28, the engine 22 may include additional or fewer cylinders 28. For example, engines having 4, 5, 8, 10, 12, and 16 cylinders are contemplated.

The engine control module (ECM) 32 communicates with components of the engine system 20. The components may include the engine 22, sensors, and actuators as discussed herein. The ECM 32 may implement control and diagnosis of the electrically heated particulate filter of the present disclosure.

Air passes through the inlet 26 through a mass airflow (MAF) sensor 34. The MAF sensor 34 generates a MAF signal that indicates a rate of air flowing through the MAF sensor 34. A manifold pressure (MAP) sensor 36 is positioned in the intake manifold 24 between the inlet 26 and the engine 22. The MAP sensor 36 generates a MAP signal that indicates air pressure in the intake manifold 24. An intake air temperature (IAT) sensor 38 located in the intake manifold 24 generates an IAT signal based on intake air temperature.

An engine crankshaft (not shown) rotates at engine speed or a rate that is proportional to engine speed. A crankshaft sensor 40 senses a position of the crankshaft and generates a crankshaft position (CSP) signal. The CSP signal may be related to the rotational speed of the crankshaft and cylinder events. For example only, the crankshaft sensor 40 may be a variable reluctance sensor. The engine speed and cylinder events may be sensed using other suitable methods.

The ECM 32 actuates fuel injectors 42 to inject fuel into the cylinders 28. An intake valve 44 selectively opens and closes to enable air to enter the cylinder 28. An intake camshaft (not shown) regulates the intake valve position. A piston (not shown) compresses and combusts the air/fuel mixture within the cylinder 28. The piston drives the crankshaft during a power stroke to produce drive torque. Exhaust gas resulting from the combustion within the cylinder 28 is forced out through an exhaust manifold 46 when an exhaust valve 48 is in an open position. An exhaust camshaft (not shown) regulates the exhaust valve position. An exhaust manifold pressure (EMP) sensor 50 generates an EMP signal that indicates exhaust manifold pressure.

An exhaust treatment system 52 may treat the exhaust gas. The exhaust treatment system 52 may include an oxidation catalyst (OC) 54. The OC 54 oxidizes carbon monoxide and hydrocarbons in the exhaust gas. The OC 54 oxidizes the exhaust based on the post combustion air/fuel ratio. The amount of oxidation may increase the temperature of the exhaust.

The exhaust treatment system 52 includes a particulate matter (PM) filter assembly 56. The PM filter assembly 56 may receive exhaust gas from the OC 54 and filter any particulate matter present in the exhaust. An electric heater 58 selectively heats the exhaust and/or a portion of the PM filter assembly 56 to initiate regeneration of the PM. The ECM 32 controls the engine 22 and filter regeneration based on various sensed and/or estimated information.

More specifically, the ECM 32 may estimate a PM filter load value based on the sensed and estimated information.

The filter load value may correspond to an amount of particulate matter in the PM filter assembly 56. The filter load value may be based on an exhaust temperature and/or the exhaust flow. Exhaust flow may be based on the MAF signal and fueling of the engine 22. When the filter load value is greater than or equal to a filter load threshold, regeneration may be initiated by the ECM 32.

The exhaust treatment system 52 may include a NOx sensor 64 and exhaust temperature sensors 66-1, 66-2, 66-3 (collectively exhaust temperature sensors 66). The NOx sensor 64 generates NOx level signals that indicate amounts of NOx and/or oxygen in the exhaust gas.

The exhaust temperature sensors 66 generate exhaust temperature signals that indicate temperatures of the exhaust gas. The exhaust temperature sensors 66 may measure temperatures of the exhaust gas before the OC 54 and the PM filter assembly 56. The exhaust temperature sensors 66 may measure temperatures of the exhaust gas after the PM filter assembly 56 and/or between the OC 54 and the PM filter assembly 56. For example only, exhaust temperature sensor 66-2 may measure an inlet gas temperature of the PM filter assembly 56. The exhaust temperature sensor 66-3 may measure an outlet gas temperature of the PM filter assembly 56. The ECM 32 may generate an exhaust temperature model to estimate exhaust temperatures throughout the exhaust treatment system 52.

Figure 2:
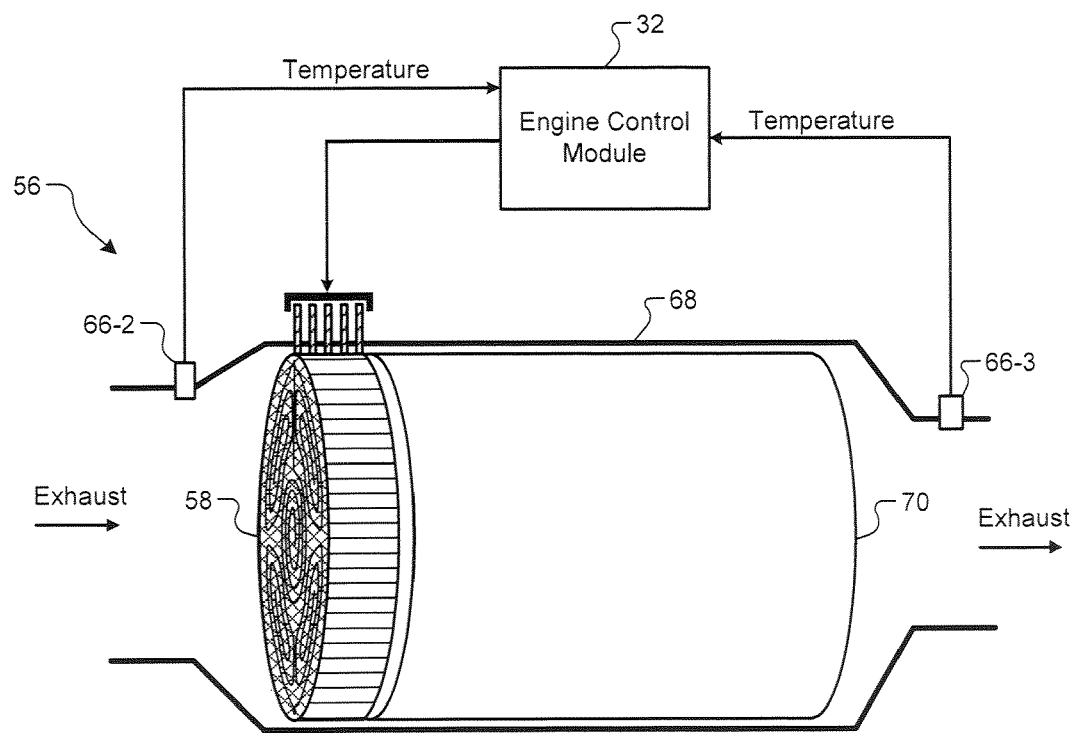
FIG. 2 illustrates an exemplary electrically heated particulate filter according to the principles of the present disclosure.
Figure 4:
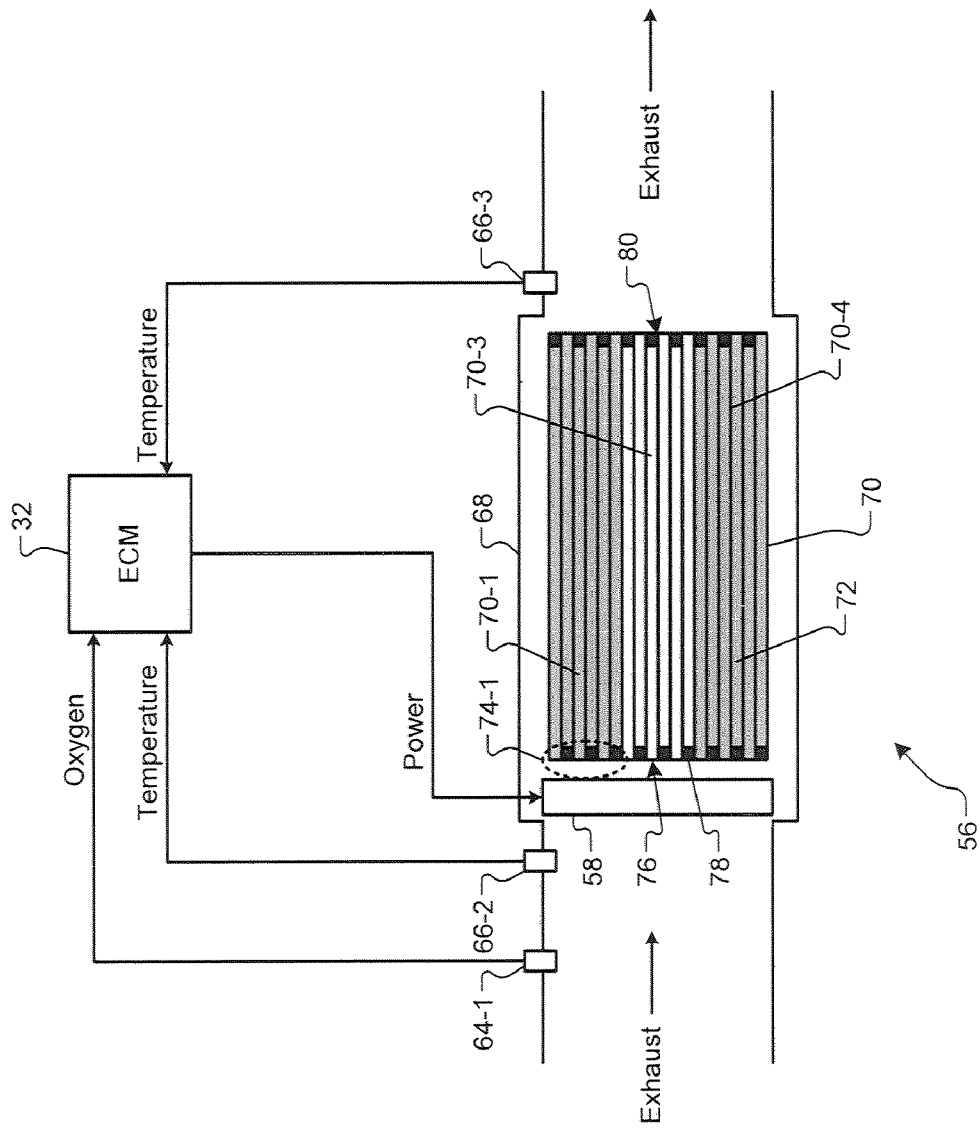
FIG. 4 illustrates regeneration of the exemplary electrically heated particulate filter according to the principles of the present disclosure.

Referring now to FIGS. 2 and 4, an exemplary PM filter assembly 56 is shown. The PM filter assembly 56 may include a housing 68, a PM filter 70, and the electric heater 58. The electric heater 58 may be arranged between the OC 54 and the PM filter 70. The ECM 32 may apply energy or power to the electric heater 58 in the form of voltage or current. The PM filter 70 includes channels 72 through which exhaust gas may flow. PM may be filtered as the exhaust gas passes through the channels 72, leaving PM inside the channels 72.

Figure 3:
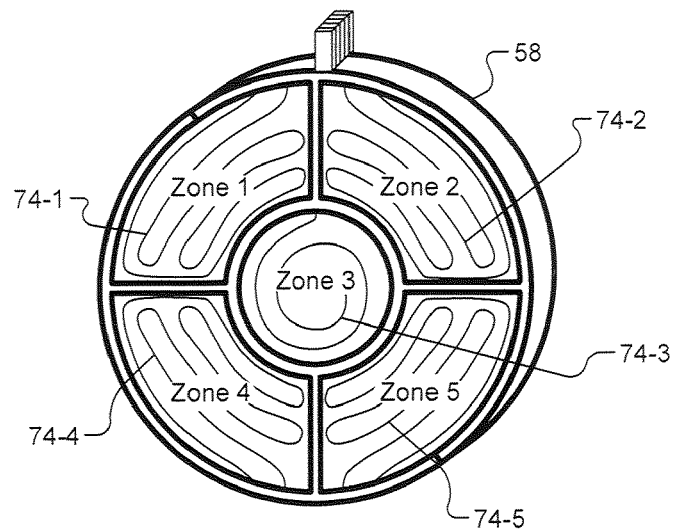
FIG. 3 illustrates zones of the exemplary electrically heated particulate filter according to the principles of the present disclosure.

Referring to FIG. 3, the electric heater 58 may comprise one or more coils, heater segments, or conductive elements that cover zones 74-1, 74-2, 74-3, 74-4, and 74-5 (collectively zones 74) of the PM filter 70 to provide heat to initiate regeneration in each of the zones 74. Each zone 74 may be an area of the PM filter 70 in contact with the electric heater 58. Each zone 74 may be an area of the PM filter 70 downstream of the electric heater 58. Regeneration may be initiated in each zone 74 by activating a zone of the electric heater 58 corresponding to each zone 74. The electric heater 58 may be activated until a temperature of the zone 74 is greater than or equal to the PM combustion temperature. For example only, PM may combust at a temperature of approximately 600° C.

Referring now to FIG. 4, the ECM 32 may initiate regeneration in a first zone 74-1 when the filter load value is greater than the filter load threshold. Exhaust gas enters the PM filter 70 from the electric heater 58 through a PM filter inlet 76. The ECM 32 may supply power to the electric heater 58 to heat exhaust gas entering the first zone 74-1. Power may be supplied to the electric heater 58 until the zone temperature is greater than or equal to the PM combustion temperature. The electric heater 58 may be heated for a predetermined time based on the heater temperature and the inlet exhaust gas temperature measured by sensor 66-2. The heater temperature may be greater than the PM combustion temperature.

The electric heater 58 heats the exhaust gas passing through the electric heater 58 to heat the first zone 74-1. The electric heater 58 may also directly heat the first zone 74-1. When the temperature of the first zone 74-1 is greater than or equal to the PM combustion temperature, PM near the first zone 74-1 ignites and initiates regeneration. For example only, PM may begin to combust behind end plugs 78 in the PM filter inlet 76.

Regeneration continues through a first filter portion 70-1 corresponding to the first zone 74-1 as exhaust gas flow advances combusting PM through the first filter portion 70-1. The first filter portion 70-1 may include one or more channels 72 extending from the first zone 74-1 to a PM filter outlet 80. The PM filter 70 may include a plurality of filter portions 70-1, 70-2, 70-3, 70-4, and 70-5 corresponding to each of the heated zones 74-1, 74-2, 74-3, 74-4, and 74-5 respectively.

When the first filter portion 70-1 regenerates, the filter outlet gas temperature near the PM filter outlet 80 may increase. Temperature sensor 66-3 may measure the filter outlet gas temperature. Initially, temperature sensor 66-3 may not detect a temperature increase because other portions of the PM filter 70 may absorb most of the heat generated by regeneration. For example only, unheated portions 70-3 and 70-4, which correspond to heated zones 74-3 and 74-4 respectively, may be at lower temperatures than the first filter portion 70-1. As the cascading PM moves closer to the PM filter outlet 80, temperature sensor 66-3 may begin to detect an increase of the filter outlet gas temperature.

The ECM 32 may determine an estimated completion period for a complete regeneration of the first filter portion 70-1. The completion period may be based on exhaust gas flow and/or exhaust temperatures. Exhaust gas flow may be based on the airflow of the engine 22 and/or fueling to the engine 22. The completion period may be based on an oxygen concentration of the exhaust gas measured by gas sensor 64. The completion period may be based on the filter load prior to regeneration. The ECM 32 may determine a regeneration completion temperature based on at least one of the exhaust gas flow, the oxygen concentration of the exhaust gas, the filter load, and the inlet exhaust gas temperature.

Figure 5:
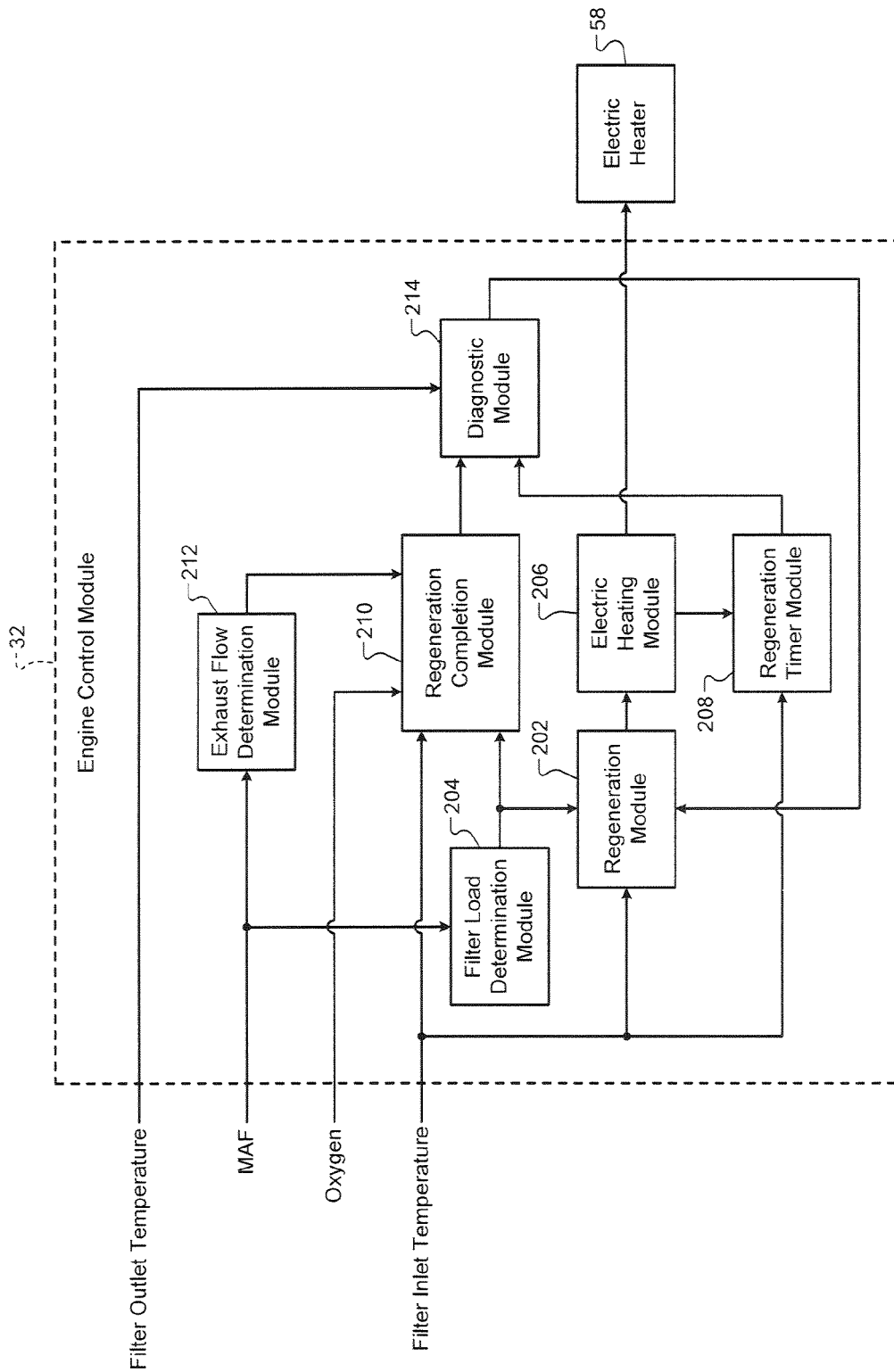
FIG. 5 is a functional block diagram of an exemplary engine control module according to the principles of the present disclosure.

Referring now to FIG. 5, a functional block diagram of an exemplary ECM 32 is presented. A regeneration module 202 may initiate regeneration of the PM filter 70 based on the filter load and the inlet filter gas temperature. A filter load determination module 204 may determine the filter load based on the MAF. When the regeneration module 202 initiates regeneration, an electric heating module 206 activates the electric heater 58 to heat exhaust gas input to the first zone 74-1. Regeneration begins when the zone temperature is greater than or equal to the PM combustion temperature. The ECM 32 may include a regeneration timer module 208 that initiates a regeneration timer based on the temperature of the first zone 74-1.

The ECM 32 may include a regeneration completion module 210 that determines the estimated completion period for regeneration of the each filter portion. The estimated completion period may be based on at least one of the filter inlet gas temperature, exhaust gas flow, filter load, and oxygen concentration of the exhaust gas. An exhaust flow determination module 212 may determine the exhaust gas flow based on the mass airflow of the engine 22 and/or fueling of the engine 22. The regeneration completion module 210 may also determine the regeneration completion temperature. The regeneration completion module 210 may also determine the post-regeneration temperature.

A diagnostic module 214 may monitor the regeneration timer and the filter outlet gas temperature during regeneration to determine whether regeneration of a portion of the PM filter 70 completes. When the filter outlet gas temperature is less than the regeneration completion temperature during the completion period, an incomplete regeneration cycle may be detected. When the filter outlet gas temperature reaches the regeneration completion temperature during the completion period, a complete regeneration cycle may be detected. For example only, when the filter outlet gas temperature reaches the regeneration completion temperature during the completion period and decreases to the post-regeneration temperature, a complete regeneration may also be detected.

The diagnostic module 214 may communicate the status of the regeneration cycle to the regeneration module 202. The regeneration module 202 may determine which zones of the PM filter 70 to regenerate based on the status of each regeneration cycle.

Figure 6:
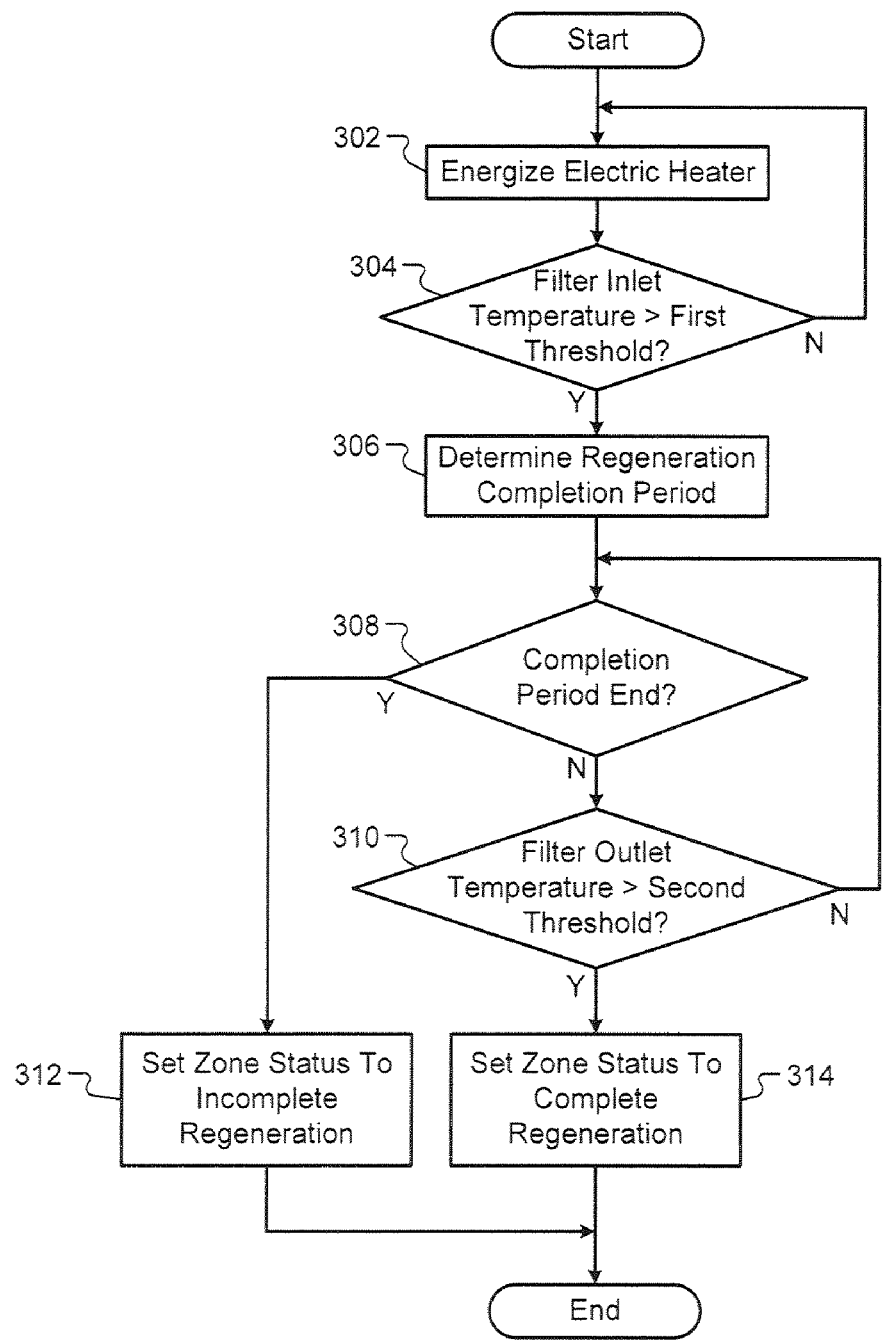
FIG. 6 is a flowchart depicting exemplary steps performed in the engine control module.

Referring now to FIG. 6, a flowchart 300 depicts exemplary steps of an engine control system according to the principles of the present disclosure. In step 302, control energizes the electric heater 58 to initiate regeneration of the first filter portion 70-1 based on the filter load value and other exhaust conditions such as the filter inlet gas temperature. The electric heater 58 heats the first zone 74-1 of the PM filter 70 to the PM combustion temperature.

In step 304, control determines whether the filter inlet gas temperature is greater than a first temperature threshold. Control may determine that regeneration of the first filter portion 70-1 has been initiated when the filter inlet gas temperature is greater than the first temperature threshold. For example only, the first temperature threshold may correspond to the PM combustion temperature in the first zone 74-1. Otherwise, control returns to step 302 and continues to energize the electric heater 58.

In step 306, control determines the completion period for regeneration of the first filter portion 70-1. The completion period may be estimated based on at least one of the filter load, exhaust gas flow rate, oxygen concentration of the exhaust gas, and the filter inlet gas temperature. In step 308, control may determine whether the completion period has ended. For example only, control may compare the regeneration timer to the completion period to determine when the completion period ends. When the completion period has not ended, control continues to step 310, otherwise control proceeds to step 312.

In step 310, control compares the filter outlet gas temperature to a second temperature threshold. The second temperature threshold may be a temperature at which PM combustion may have completed regeneration of the first filter portion 70-1. For example only, the second temperature threshold may be the regeneration completion temperature. The diagnostic module 214 may determine the second temperature threshold based on at least one of the filter load, exhaust gas flow rate, oxygen concentration of the exhaust gas, and the filter inlet gas temperature.

When the filter outlet gas temperature is less than or equal to the second temperature threshold, control returns to step 308. If the filter outlet gas temperature is less than or equal to the second temperature threshold and the completion period ends, control proceeds to step 312. In step 312, control sets the status of the regeneration cycle to an incomplete regeneration. When the filter outlet gas temperature is greater than the second temperature threshold, control continues to step 314. In step 314, control sets the status of the regeneration cycle to a complete regeneration.

Control may proceed to initiate regeneration of other zones corresponding to other filter portions. Control may regenerate a plurality of filter portions until the entire PM filter has been regenerated. Control may continue to diagnose completion of the regeneration cycle of each of the plurality of filter portions.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system comprising:
   an electric heater comprising N zones that correspond to N longitudinal portions along a length of a particulate matter (PM) filter, respectively, wherein N is an integer greater than one;
   a regeneration module that controls a first one of the N zones of the electric heater to heat exhaust gas produced by an engine, and that determines when a regeneration cycle of a first one of the N longitudinal portions of the PM filter begins by comparing a temperature of the exhaust gas input to the PM filter and a first temperature threshold, wherein the first one of the N longitudinal portions of the PM filter corresponds to the first one of the N zones of the electric heater; and
   a diagnostic module that determines a regeneration status of the regeneration cycle by comparing a temperature of the exhaust gas output by the PM filter and a second temperature threshold during a predetermined period after the regeneration cycle begins,
   wherein the regeneration module controls a second one of the N zones of the electric heater to start another regeneration cycle of a corresponding second one of the N longitudinal portions of the PM filter when the regeneration status indicates that the regeneration cycle was incomplete.

2. The system of claim 1, wherein the regeneration module determines the regeneration cycle begins when the temperature of the exhaust gas input to the PM filter is greater than the first temperature threshold.

3. The system of claim 1, further comprising a regeneration completion module that determines the predetermined period based on at least one of an amount of PM in the PM filter, a flow rate of the exhaust gas, an oxygen concentration of the exhaust gas, and the temperature of the exhaust gas input to the PM filter.

4. The system of claim 1, further comprising a regeneration completion module that determines the second temperature threshold based on at least one of an amount of PM in the PM filter, a flow rate of the exhaust gas, an oxygen concentration of the exhaust gas, and the temperature of the exhaust gas input to the PM filter.

5. The system of claim 1, wherein the diagnostic module determines the regeneration status is incomplete when the temperature of the exhaust gas output by the PM filter is less than or equal to the second temperature threshold during the predetermined period.

6. The system of claim 1, wherein the diagnostic module determines the regeneration status is complete when the temperature of the exhaust gas output by the PM filter is greater than the second temperature threshold during the predetermined period.

7. The system of claim 1, wherein the diagnostic module determines the regeneration status is complete when the temperature of the exhaust gas output by the PM filter is greater than the second temperature threshold at a first time during the period and less than or equal to a third temperature threshold at a second time during the period, wherein the second time is greater than the first time.

8. The system of claim 7, wherein the third temperature threshold is less than second temperature threshold.

9. The system of claim 1, wherein the first temperature threshold is greater than the second temperature threshold.

10. A method comprising:
controlling a first one of N zones of an electric heater to heat exhaust gas produced by an engine, wherein the N zones of the electric heater correspond to N longitudinal portions along a length of a particulate matter (PM) filter, respectively, and wherein N is an integer greater than one;
determining when a regeneration cycle of a first one of the N longitudinal portions of the PM filter begins by comparing a temperature of the exhaust gas input to the PM filter and a first temperature threshold, wherein the first one of the longitudinal portions of the PM filter corresponds to the first one of the N zones of the electric heater;
determining a regeneration status by comparing a temperature of the exhaust gas output by the PM filter and a second temperature threshold during a predetermined period after the regeneration cycle begins; and
when the regeneration status indicates that the regeneration cycle was incomplete, controlling a second one of the N zones of the PM filter to start another regeneration cycle of a corresponding second one of the N zones of the PM filter.

11. The method of claim 10, further comprising determining the regeneration cycle begins when the temperature of the exhaust gas input to the PM filter is greater than the first temperature threshold.

12. The method of claim 10, further comprising determining the predetermined period based on at least one of an amount of PM in the PM filter, a flow rate of the exhaust gas, an oxygen concentration of the exhaust gas, and the temperature of the exhaust gas input to the PM filter.

13. The method of claim 10, further comprising determining the second temperature threshold based on at least one of an amount of PM in the PM filter, a flow rate of the exhaust gas, an oxygen concentration of the exhaust gas, and the temperature of the exhaust gas input to the PM filter.

14. The method of claim 10, further comprising determining the regeneration status is incomplete when the temperature of the exhaust gas output by the PM filter is less than or equal to the second temperature threshold during the predetermined period.

15. The method of claim 10, further comprising determining the regeneration status is complete when the temperature of the exhaust gas output by the PM filter is greater than the second temperature threshold during the predetermined period.

16. The method of claim 10, further comprising determining the regeneration status is complete when the temperature of the exhaust gas output by the PM filter is greater than the second temperature threshold at a first time during the period and less than or equal to a third temperature threshold at a second time during the period, wherein the second time is greater than the first time.

17. The method of claim 16, wherein the third temperature threshold is less than second temperature threshold.

18. The method of claim 10, wherein the first temperature threshold is greater than the second temperature threshold.

* * * * *